UNITED STATES PATENT OFFICE.

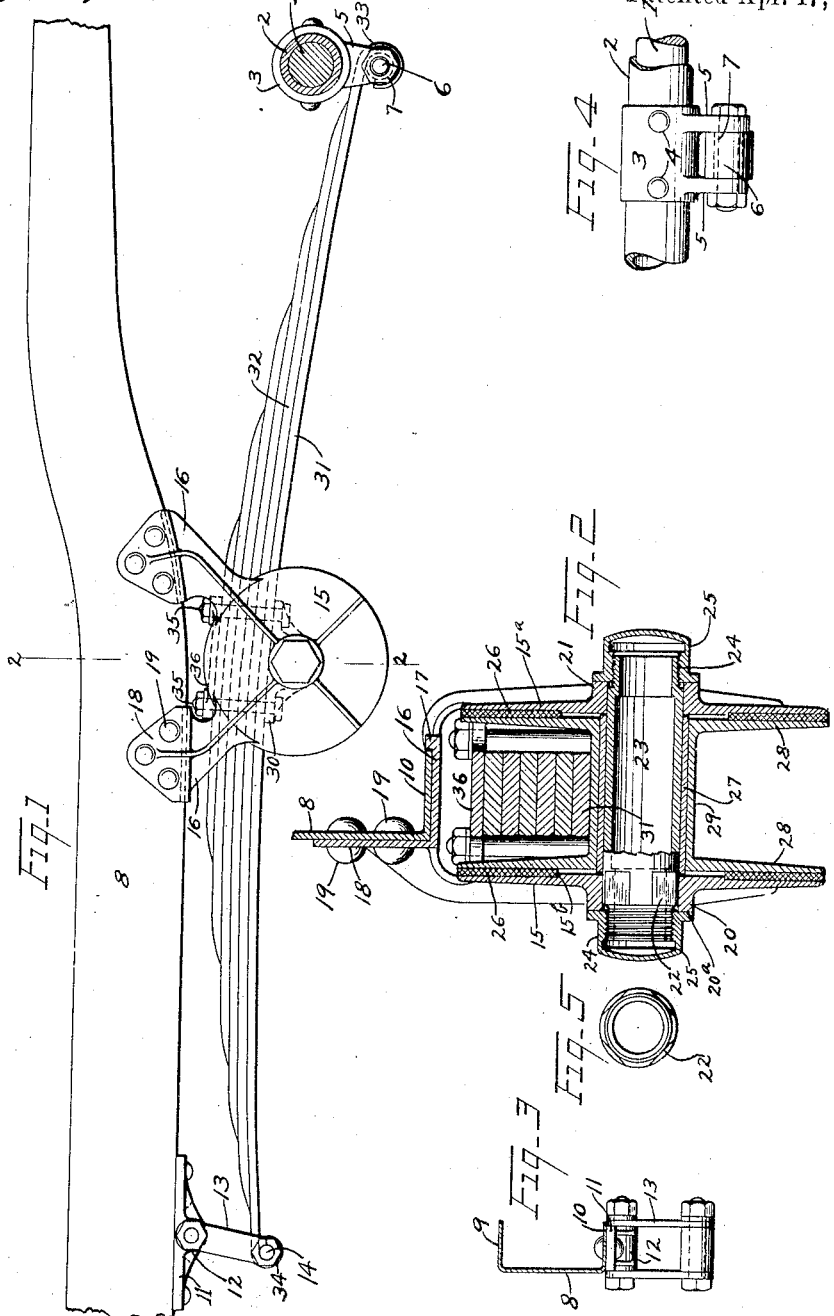

WALTER C. BAKER, OF CLEVELAND, OHIO.

SHOCK-ABSORBING DEVICE.

1,223,307.  Specification of Letters Patent.  Patented Apr. 17, 1917.

Application filed June 12, 1912. Serial No. 703,216.

*To all whom it may concern:*

Be it known that I, WALTER C. BAKER, a citizen of the United States, residing at Cleveland, in the county of Cuyahoga and State of Ohio, have invented a certain new and useful Improvement in Shock-Absorbing Devices, of which the following is a full, clear, and exact description, reference being had to the accompanying drawings.
This invention relates to shock absorbing devices operating in combination with vehicle springs to prevent excessive and injurious vibration thereof, with the view of lengthening the life of the springs and avoiding sudden and excessive movements of the vehicle body with attendant discomfort to the passengers. It is the general object of my invention to provide a shock absorbing device which is particularly simple in construction and which is capable of applying a frictional resistance to a portion of the spring in such manner as to act as a brake and to minimize the transmission of vibrations from one section of the spring to another.

A further object of my invention is to provide a device of this kind which will operate without the addition of any links or joints or surfaces except those which are relied upon to produce the frictional resistance.

With the foregoing general objects in view, the invention may be defined further as consisting of the combinations of elements embodied in the claims appended hereto and illustrated, in one exemplification, in the drawings forming part hereof wherein Figure 1 represents a side elevation of a spring and a portion of the vehicle frame, illustrating one manner in which my shock absorbing device may be combined with a spring, the axle being shown in section; Fig. 2 represents an enlarged vertical sectional view corresponding to the line 2—2 of Fig. 1; Fig. 3 is a detail of the shackle connection between one end of the spring and the frame, the frame being shown in section; Fig. 4 a detail in elevation of the connection between the opposite end of the spring and the axle, and Fig. 5 an end elevation of the hollow bolt which connects the sides of the combined spring supporting frame and shock absorbing device.

Describing by reference characters the various parts illustrated herein, 1 denotes the axle of a vehicle, the vehicle being prefer-
ably an automobile and the axle being mounted within a housing 2. A spring hanger is secured to this housing, said hanger comprising preferably a sleeve 3 mounted upon the housing 2 and secured thereto in any suitable manner, as by rivets 4. This spring hanger is provided with a pair of downwardly extending lugs, 5, each of which is provided with a circular perforation at its lower end for the support of a bolt 6, there being a bushing 7 on said bolt.

8 denotes one of the side frames of the vehicle, said frame being preferably channeled and having its flanges 9 and 10 directed inwardly. To the bottom flange 10 there is secured a plate 11 having downwardly extending lugs 12, to which are pivotally connected the shackle links 13, said links being provided with the usual apertures for the reception of the spring bolt 14.

Secured to the side frame 8, between the axle 1 and the hanger plate 11, is a combined spring-seat and shock absorbing device. This device is constructed as follows:—15 and 15$^a$ denote the opposite side plates of a frame, said side plates being circular in general outline and being disconnected at their bottoms but connected at their tops by a pair of inverted U-shaped straps 16. These straps are angularly spaced, as will appear from Fig. 1, and each has a flattened top for the reception of the lower flange 10 of the side frame. Each strap is provided with a substantially vertical shoulder 17 and a vertical flange 18 adapted to receive therebetween the bottom flange of the channeled side frame, the flange 18 being secured to the vertical web of the side frame, as by rivets 19.

The side plates 15 and 15$^a$ are preferably circular in outline and are each provided with a laterally projecting hub 20, 21, respectively. The hub 20 has an angular seat 20$^a$, which seat is adapted to receive the angular portion 22 of the hollow bolt 23 and thereby prevent the rotation of said bolt. The bolt is provided with reduced threaded extensions 24 projecting beyond the hubs 20 and 21 and adapted to receive the combined nuts and dust-caps 25.

Each plate 15, 15$^a$ is provided with an inwardly projecting annular ledge 15$^b$ concentric with and surrounding the central bore therethrough, each ledge forming a seat for an annular friction washer 26, the outer periphery of each washer being preferably flush with the outer periphery of the circular portion of each of the plates 15 and 15ª.

Surrounding the bolt 23 is a bushing 27. Mounted on this bushing is a spring seat, the seat consisting generally of a pair of annular plates 28 connected by a hub 29, the hub surrounding the bushing 27 and the outer periphery of the plates 28 being preferably flush with the outer periphery of the plates 15, 15ª. The width of this spring seat is such that the outer faces of the plates 28 will bear against the friction washers 26, and said plates are preferably slightly flared or tapered outwardly from the hub. The upper portion of the hub 29 is extended so as to provide a flattened plate 30 against which the vehicle spring bears. Coöperating with this plate is another plate, which will be described in connection with the spring.

The spring shown herein is of the semi-elliptic type having a main leaf 31 and auxiliary leaves 32. One end of the main leaf is provided with an eye 33 into which the bushing 6 is fitted and the other end is provided with an eye for the bolt 14. In the embodiment of my invention shown herein, the main leaf is the bottom leaf of the spring and has its central portion extending through the spring seat assembly, between the side plates thereof, being clamped to the spring seat proper. This clamping is effected by means of bolts 35 extending through the plate 30, on which the main leaf rests, through the spring leaves, and through a coöperating plate 36 which bears against the top or short leaf of the spring.

With the construction described and illustrated herein, it will be apparent that the central portion of the spring is pivotally secured to the vehicle frame 8 through the depending frame construction including the plates 15 and 15ª. It is also apparent that the plates 28 of the spring seat will bear against the friction washers 26 and that, by adjusting the nuts 25, the frictional resistance to the rotation of the spring seat on its bushing may be varied as conditions may require. Such being the case, it will be evident that the transmission of any vibratory movement from that portion of the spring which is adjacent to the axle 1 to the portion of the spring on the other side of the spring seat assembly and vice versa will be checked, retarded, and more or less absorbed by the frictional resistance interposed between these two portions of the spring.

While, in the embodiment of my invention shown herein, the device which retards the transmission of the vibratory movement from one section of the spring to another is shown as operating upon the central portion of the spring, it will be evident that advantageous results may be secured by locating such device elsewhere, as at the ends. In the operation of my invention the shock absorbing is accomplished in connection with a rotary movement of a part of the spring about some support, the shock absorbing being produced by opposing a frictional resistance to such rotary movement of the spring. Furthermore, although I have shown and described this embodiment of my invention in detail, it will be understood that I do not propose to limit myself to such details except as such limitations may be positively included in the claims hereto annexed or may be rendered necessary by the prior state of the art.

Having thus described my invention, what I claim is:—

1. The combination, with a vehicle spring, of means located on the opposite sides of a portion of said spring and opposing a frictional resistance to the transmission of motion or vibration from one section of the spring to another.

2. The combination of a spring, a pair of opposed plates secured to and located on opposite sides of the spring, means rotatably supporting said plates, and means frictionally engaging said plates to check the rotation thereof and of the spring.

3. The combination of a spring, a pair of opposed plates, a spring connected to said plates and extending therebetween, means rotatably supporting said plates, means frictionally engaging said plates, and means for varying the friction exerted upon said plates.

4. The combination of a spring seat comprising a pair of opposed plates, a spring connected to said seat and extending between said plates, a rotary support for said seat, and means frictionally engaging said plates.

5. The combination, with a vehicle frame, of a pair of opposed plates carried by said frame, friction material on the inner surfaces of said plates, a spring seat rotatably mounted between said plates and comprising a pair of plates adapted to engage the friction material, and means for moving the first mentioned plates toward and from each other to vary the frictional engagement between the spring seat plates and the friction material.

6. The combination, with a vehicle frame, of a support comprising a pair of opposed plates suspended from said frame, said plates being provided with apertures, a bolt extending through said apertures, friction washers mounted on the inner surface of said plates, a bushing surrounding said bolt, a spring seat mounted on said bushing and comprising a pair of opposed plates adapted to bear against said washers, a spring connected to said seat and extending between the plates thereon, and one or more nuts on said bolt.

7. The combination of a rotary spring seat, a spring connected to said seat, and means for frictionally retarding the rotation of said seat.

8. The combination, with a vehicle frame, of a rotary spring seat supported by said frame, a spring connected to said seat, and adjustable means for frictionally retarding the rotation of said seat.

9. The combination, with a spring, of a support with reference to which a portion of said spring is adapted to rotate, a plate on each side of said spring and operatively connected therewith, and movable about the pivotal support, and plates coöperating with respect to the first-mentioned plates and adapted to check the rotary movement of the spring with reference to its support.

10. The combination, with a spring, of means rotatably supporting a portion of said spring, a plate on each side of said spring and rotatable about the support, and plates adapted to coöperate with the first-mentioned plates to resist the rotary movement thereof.

11. The combination, with a continuous leaf spring, of means frictionally engaging an intermediate portion of said spring and adapted to check or retard the transmission of vibrations from a section of said spring on one side of said means to a section of the spring on the other side of said means.

12. The combination, with a continuous leaf spring, of means adapted to engage the opposite sides of said spring and frictionally retard the transmission of vibrations from the section of the spring on one side of such engaging means to a section on the other side of the same.

13. The combination, with a continuous leaf spring, of means adapted to engage the opposite sides of said spring and frictionally retard the transmission of vibrations from a section of the spring on one side of said engaging means to a section on the other side of said means, and means whereby the frictional engagement may be varied.

14. The combination, with a spring, of means pivotally supporting said spring intermediate of the ends, and means coöperating with the supporting means for frictionally engaging the sides of the spring to prevent the transmission of vibrations from the section of the spring on one side of the support to a section on the other side of said support.

15. The combination, with a vehicle spring, of a pivotal support for the central portion of said spring, means coöperating with said support and adapted to frictionally engage opposite sides of the spring, and means whereby the frictional engagement may be varied.

16. The combination with a vehicle frame, of a spring, a pivotal connection for said spring intermediate its ends, and a friction means engaging said connection.

17. The combination with a vehicle frame, of a spring, a pivotal connection for said spring intermediate its ends, and an adjustable friction means engaging said connection.

18. The combination with a vehicle frame, of a spring, a pivotal connection for said spring intermediate its ends and secured to the frame, and a friction means engaging said pivotal connection.

In testimony whereof, I hereunto affix my signature in the presence of two witnesses.

WALTER C. BAKER.

Witnesses:
 ALBERT H. BATES,
 J. B. HULL.